Oct. 19, 1965
R. J. ROMAN ETAL
3,212,840
FILM FEEDING MECHANISM
Filed Aug. 8, 1962
2 Sheets-Sheet 1
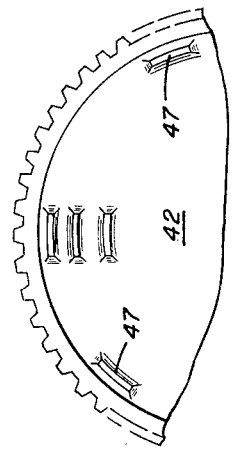
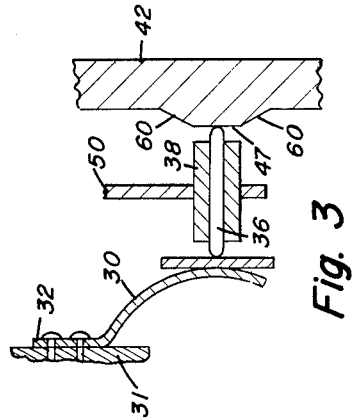
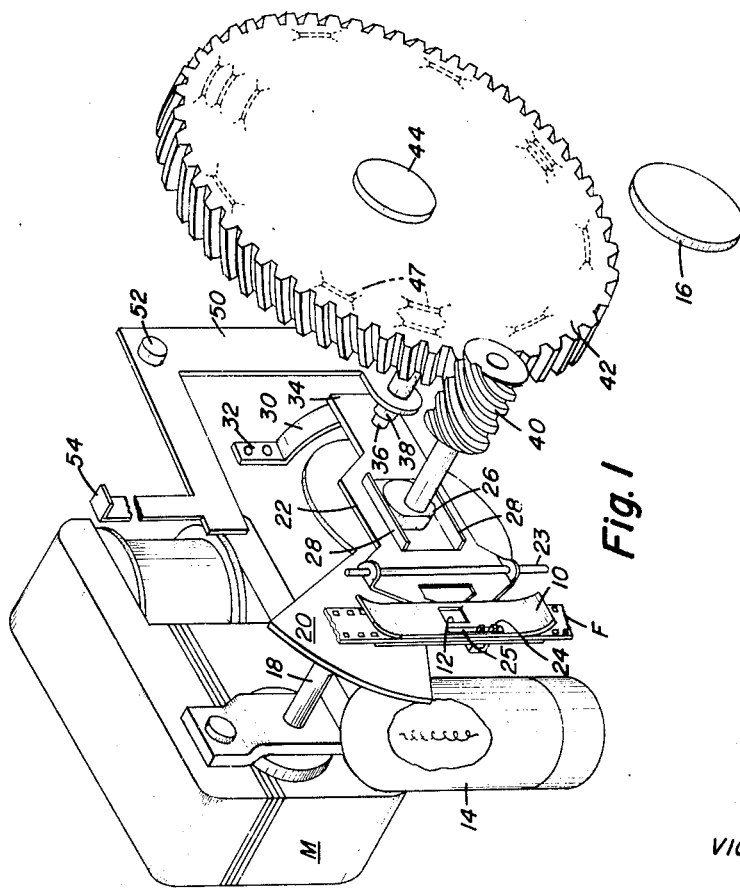
ROBERT J. ROMAN
VICTOR J. WITKOWSKI
INVENTORS
BY *R. Frank Smith*
*Earl T. Laramy*
ATTORNEYS

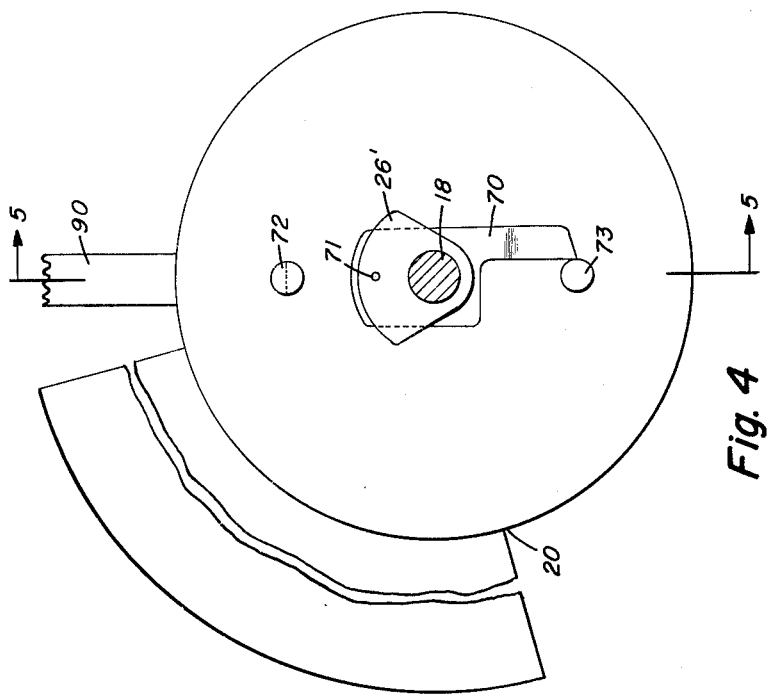
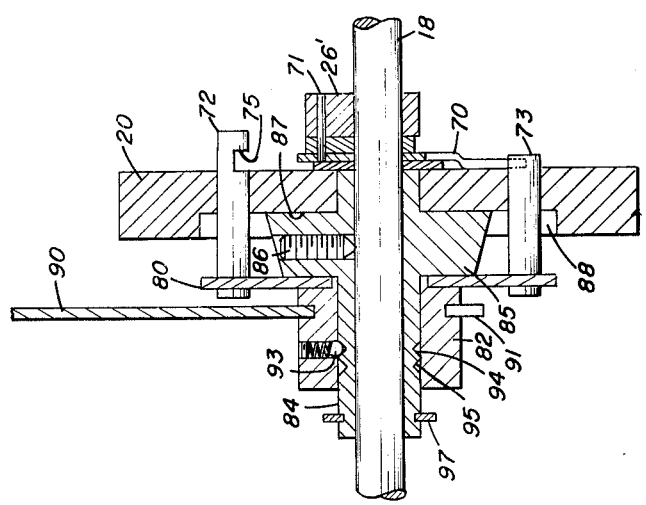

3,212,840
FILM FEEDING MECHANISM
Robert J. Roman and Victor J. Witkowski, Rochester, N.Y., assignors to Eastman Kodak Company, Rochester, N.Y., a corporation of New Jersey
Filed Aug. 8, 1962, Ser. No. 215,698
19 Claims. (Cl. 352—194)

The present invention relates to an intermittent pulldown system for motion picture apparatus, and particularly to an intermittent claw pulldown mechanism for motion picture projectors by the use of which fast motion, normal motion, slow motion and still projection can be achieved in both forward and reverse operation of the projector without a significant loss of light or increase in flicker. The mechanism also provides for reverse projection at any rate of motion, as well as still projection without stopping the shutter.

A common procedure used for obtaining slow motion effects in motion pictures has been to expose them at a rate in excess of that at which they are to be projected, i.e., a projection rate of 16–18 frames per second for silent pictures and 24 frames per second for sound pictures. Some attempts have been made to selectively vary the rate of film pulldown in projectors in order to obtain slow motion and rapid motion effects in the projection of films exposed at normal speed. Such attempts, however, have generally involved varying the rate of pulldown by changing the speed of the motor driving the projector by the use of a rheostat in the motor circuit and have not been particularly successful because this mode of altering the rate of projection, particularly when slowing projection down for achieving slow motion effects, also necessarily slowed down the shutter and introduced a flicker condition or a significant loss of light on the screen.

While known projectors provide means for reversing the intermittent film advancing mechanism to obtain reverse projection, such reversing required that the prime mover for the pulldown claw be stopped and then reversed in its direction of operation. All of this requires time during which the shutter stops and reverses so that there is a period when the screen is dark and undesirable flicker results. In the projection of "stills" it has been customary to stop the pulldown mechanism and stop the shutter in an open position. This procedure not only involves a strain on the mechanism by reason of abruptly stopping the shutter and its associated driving mechanism, but involves a delay in subsequent resumption of projection by reason of the parts having to resume their normal operating speed from a standstill condition.

The primary object of the present invention is to provide an improved variable rate pulldown system for motion picture projectors by the use of which fast motion, normal motion, slow motion, as well as still projection, can be achieved almost instantly without having to stop or change the speed or direction of operation of the drive means for the pulldown mechanism and/or shutter.

Another object is to provide an improved variable rate pulldown system which allows a change in rate of projection without significant loss of light or increase in flicker on the screen.

And still another object is to provide an improved variable rate pulldown system which allows for reverse projection at any projection rate, as well as still projection, without having to stop or reverse the drive means for the pulldown system and the shutter.

And a further object is to provide a pulldown system which can be reversed almost instantly without changing the direction of, or stopping, the drive means therefor.

The novel features that we consider characteristic of our invention are set forth with particularity in the appended claims. The invention itself, however, both as to its organization and its methods of operation, together with additional objects and advantages thereof, will best be understood from the following description when read in connection with the accompanying drawings in which:

FIG. 1 is a perspective view showing an intermittent pulldown system for a motion picture projector constructed in accordance with a preferred embodiment of the present invention, FIG. 2 is a partial front elevational view of the face cam of the mechanism which provides the in and out movements of the film claw, FIG. 3 is an enlarged sectional detail showing the manner in which in and out motion is transmitted to the pulldown claw by the in and out cams, FIG. 4 is an enlarged sectional detail view taken through the shutter shaft just ahead of the shutter and showing how the up and down cam is connected to the drive shaft so that it can be reoriented 180° thereon to reverse the direction of film advance without stopping or changing the direction of rotation of the drive shaft, and FIG. 5 is a sectional view taken substantially on line 5—5 of FIG. 4.

Referring now to the drawings, for purposes of clarity and simplification we have shown only those parts of a motion picture projector which are essential to an understanding of the present invention. These parts include an apertured film gate 10 the aperture 12 of which is illuminated by a lamp 14 located behind the gate. A motion picture film F is adapted to be intermittently moved through this gate by an improved pulldown claw mechanism to be described hereinafter, and as each frame of the film is moved into alignment with the aperture in the gate and is illuminated by the lamp it is projected by lens 16 onto a screen not shown.

The prime mover of the projector comprises an electric motor M the drive shaft 18 of which extends to one side of, and substantially parallel to, the optical axis of the projector. Under normal load conditions the motor shaft 18 will rotate at approximately 3250 r.p.m. or 54 cycles/sec. which is the normal operating speed of certain commercially available small electric motors. The light beam is repeatedly cut off from the projection aperture of the gate by a rotating sector shutter 20 fixed to the drive shaft 18. Since this shutter has but a single cut-off blade it will intercept the light beam at 54 cycles per second and then only at the time the film is being advanced through the gate as is well known in the art.

Coming now to the intermittent film feeding mechanism, this includes a rigid claw arm 22 extending laterally of the film to be fed and having turned-over perforated ears slidably and pivotally engaging a fixed rod 23 which extends substantially parallel to the film gate and to one side thereof. One end of the claw arm is turned at right angles to the body of the arm and is provided with one or more claws or teeth 24 which are adapted to engage the perforations of the film F to advance the same. As is well known, the claw will reciprocate up and down the rod 23 to effect the film advance and will pivot about said rod to move the claws or teeth 24 into and out of engagement with the film, the gate being provided with an elongated slot 25 to accommodate the pulldown claws and allow the up and down movement of the claw arm while the claws are in engagement with the film.

In the arrangement shown, the up and down reciprocal movement of the claw arm edgewise for feeding the film is under the control of an up and down cam 26 fixed to the drive shaft, which cam is embraced by a pair of followers 28 fixed to the claw arm and extending substantially at right angles to the rod 23. Since each revolution of the up and down cam produces one complete reciprocal stroke of the film claw, and the drive shaft is rotating at 54 r.p.s., it follows that the claw will be operated at a rate of 54 strokes per second.

The in and out movement of the pulldown claw relative to the film gate is produced by a novel mechanism which will now be described. A spring 30, one end 32 of which is fastened to a wall portion of the projector indicated at 31 in FIG. 3, bears against the back of the end 34 of the claw arm remote from the film engaging claws, causing the claw arm to be normally pivoted about rod 23 in a direction to withdraw the claw from engagement with the film in the gate. At the same time spring 30 urges the front surface of the end 34 of the claw arm against a follower pin 36 which is free to slide inside of bushing 38, see FIG. 3. Also secured to drive shaft 18 is a worm gear 40 which engages complementary gear teeth on the periphery of a wheel or face cam 42 rotating about an axis 44 which is parallel to the drive shaft.

The inner face of the face cam or wheel 42 contains a series of cam lobes 47 arranged in three concentric circles. The outer circle has nine evenly spaced cam lobes, the next inner circle has three evenly spaced cam lobes, and the next circle has one cam lobe. Finally, within the innermost circle containing a single cam lobe there is a circle which contains no lobe. Follower bushing 38 is fixed to a lever 50 which pivots about a stud shaft 52 fixed to the projector housing, not shown, and said lever includes a shaft handle 54 which extends through the top of the projector housing to be accessible to the operator. When the lever 50 is rotated by means of shaft handle 54, follower pin 36 can be moved radially of the face cam 42 and along the end 34 of the claw arm 22 to be positioned in alignment with any of the aforementioned circles on the face cam. The flat surface of the face cam is so disposed that when the follower pin 36 engages it the spring 30 pivots the claw arm by a sufficient amount to swing the claw out of engagement with the film in the gate. All of the cam lobes 47 have the same rise or throw, and which is of such dimension that when the follower pin engages the top thereof the claw arm is pivoted about rod 23 against the action of spring 30 by an amount which will move the film claw into engagement with the film to advance the same. Obviously, each of the cam lobes is of sufficient length as to hold the claw in engagement with the film long enough to produce the advancing stroke of the film. Accordingly, each circular series of lobes 47 in combination with the face of the wheel 42 constitutes a circular in and out face cam for controlling the in and out movement of the claw with respect to the film path at the gate. While the innermost circle described has no lobes 47, the face of the wheel allows the claw to be spring held out of engagement with the film for the projection of "stills" and in reality constitutes an in and out cam despite the fact that it possesses no lobes.

The reduction ratio between worm gear 40 and wheel or face cam 42 is nine to one (9:1). Since there are nine lobes 47 on the outer circular series of lobes, when the follower pin 36 is positioned to engage this series of lobes it will produce an in and out stroke per revolution of the up and down cam 26. This means that film F will be pulled down one frame per revolution of the cam 26 or at a rate of 54 frames per second. When the follower pin 36 is moved inwardly of the face cam to the next circular series of lobes 47, or that circle containing three lobes, it produces one in and out stroke of the claw for every three revolutions of the up and down cam 26, or 18 frames per second. When the follower pin 36 is moved inwardly to the circle containing one lobe it produces one in and out stroke of the claw for every nine revolutions of the up and down cam 26 or six frames per second.

If the follower pin 36 is moved in on the face cam to a portion where there are no lobes, there will be no in and out stroke of the claw but the claw teeth will be held out of engagement with the film by spring 30. This will produce a desirable condition of still projection in which the shutter continues to run. It is also pointed out that for all three film speeds described, as well as during still projection, the light beam interruption rate by the shutter, and hence the flicker, has remained constant at 54 interruptions per second. Furthermore, the amount of light transmitted remains constant and independent of the rate of projection.

As will be noted in FIG. 3, the cam lobes 47 as well as the end of the follower pin 36 engaging the face cam 42 are shaped to allow the shifting of the follower pin 36 from one circular face cam to the next concentric one without stopping the mechanism. As most clearly shown in FIG. 3, this involves tapering the long sides of each lobe 47 as shown at 60 and rounding the end of the follower pin engaging the same. This produces an apparently instant change of frame rate which is highly desirable. In addition, there is little difference in mechanism noise from fast to slow film speeds. It goes without saying that the leading and trailing edges of each cam lobe 47 are tapered to allow the end of the follower pin 36 to move up onto and down off of each lobe as the face cam rotates relative thereto.

While we have shown the claw normally biased outwardly from the film to a film disengaging position, it will be understood that it could be biased inwardly to a film engaging position as is sometimes done in conventional projectors. The present invention could be readily adapted to such an arrangement by merely placing the face cam 42 on the opposite side of the claw to that shown so that the follower would be biased against the other face of the 42 and substituting depressed cam surfaces for the raised cam lobes 47. Such depressed cam surfaces would have the same axial displacement and arcuate length as the cam lobes 47 and would be the equivalent of said lobes from the functional standpoint.

The variable intermittent pulldown mechanism described up to this point can feed film at 54, 18 or 6 frames per second with instant shift from one rate to another. This means that film is traveling through the projector at 8.1, 2.7 or 0.9 inches per second, respectively. With a sprocketless projector of the well known type, i.e., where the film is pulled directly from the supply reel and fed to the takeup reel by the pulldown claw, this difference in film rate is absorbed easily by the takeup and supply reels which are generally tendency driven by means of a spring belt and pulley, a slipping clutch, or similar drive. If this pulldown system were used on a conventional sprocket-type projector, however, means would have to be provided to alter the sprocket feed rate in exact synchronism with a change in rate of the pulldown mechanism in order to avoid loss of the film loop ahead of the pulldown claw. This would probably involve such a complicated and expensive sprocket driving mechanism as to take such a projector out of the price range of amateur projection equipment.

While we have mentioned certain rates of projection in describing our invention, it will be appreciated that more or less speed changes could be provided without going beyond the scope of the present invention. Likewise, while we have shown one arrangement of parts by which the desired change in frequency between the up and down and in and out movements of the claw can be achieved almost instantly while the prime mover is operating at one speed, it is pointed out that the present invention is not limited to the particular arrangement of parts disclosed to accomplish this end, but is intended to cover equivalent arrangements for achieving the same result, i.e., the use of a plurality of separate in and out cams operating at different frequencies relative to that of the up and down cam and means for selectively connecting any one of these in and out cams to the pulldown claw for use in combination with the up and down cam.

In order to achieve reverse projection with this variable rate pulldown system without having to stop or reverse the direction of drive of the motor M, an arrangement of parts has been devised for reorienting the up and down cam 26 180° so that the claw teeth thereof are pivoted into engagement with the film perforations at the end of the pulldown stroke of the claw and are moved out of engagement with the film at the end of the upward stroke of the claw instead of vice versa as is the case for forward projection.

To this end, referring to FIGS. 4 and 5, the up and down cam 26' can be rotatably mounted on the drive shaft 18 and have a radial arm 70 secured thereto by a pin 71. This arm 70 is adapted to be alternatively engaged and driven by either of two drive pins 72 and 73 located 180° apart and slidably extending through holes in the hub portion of the shutter 20. One drive pin 72 is notched at 75 to allow arm 70 to pass through it, while the other drive pin 72 has a length corresponding to the shortest part of the notch 75. Shifting both drive pins 72 and 73 relative to the plane of movement of the arm 70 gives the choice of driving the arm 70 and the up and down cam 26' secured thereto by either pin 72 or 73. To shift the pins 72 and 73 between their two positions they are each fixed at one end to a disk 80 which is in turn secured to a bushing 82 slidably mounted on the hollow shaft 84 of a bearing 85, which is secured to the drive shaft 18 by a set screw 86 and has a key portion 87 engaging a keyway 88 in the hub portion of the shutter 20 to drivingly connect the shutter to the drive shaft. While the drive shaft and the shutter are rotating, the drive pins 72 and 73 can be slid axially between their two operating positions by means of a shift lever 90, one end of which has a yoke 91 engaging a groove in the bushing 82, and the other end of the shift lever 90 extending through the top of the projector to be manually engaged by the operator. The drive pins 72 and 73 can be maintained in either position of adjustment by the detent action of a spring-loaded ball 93 carried by bushing 82 snapping into one or the other of two grooves 94 and 95 formed in and spaced axially of the bushing 82. A stop ring 97 may be fixed to the drive shaft 18 to limit the motion of the bushing 82 in a direction away from the shutter and to prevent the drive pins 72 and 73 from being withdrawn from driving engagement with the shutter in case the shift lever 90 is moved so far as to shift the bushing 82 to a point beyond which the spring-loaded ball 93 might tend to move out of and beyond the groove 95.

While we have shown this reversing mechanism in combination with our new variable rate pulldown mechanism it is pointed out, and it will be appreciated by those skilled in the art, that this reversing mechanism could be used in combination with any conventional pulldown mechanism capable of only one rate of projection with or without provision for still projection.

Although we have shown and described certain specific embodiments of our invention we are fully aware that many modifications thereof are possible, and our invention, therefore, is not to be restricted to the precise details of construction shown and described but is intended to cover all modifications coming within the scope of the appended claims.

We claim:
1. A motion picture projector comprising in combination:
   (A) a gate having a projection aperture and through which gate a motion picture film is adapted to be intermittently advanced past the aperture therein for the projection of successive image frames thereon,
   (B) a film claw,
   (C) means for mounting said claw for up and down and in and out movement relative to said gate to intermittently advance the film through said gate,
   (D) drive means,
   (E) a shutter connected to said drive means to intermittently intersect the optical axis of said projection aperture and interrupt the passage of light therethrough at a given frequency,
   (F) an up and down cam connected to said drive means and to said claw to drive said claw up and down relative to said gate at said given frequency,
   (G) means for imparting in and out movements to said claw to intermittently engage said film in different time relations with said up and down movement thereof and including
      (1) a plurality of in and out cams concentrically arranged at different radial distances from and rotatable about a common axis of rotation substantially parallel to the optical axis of said gate, said in and out cams being selectively operably connectable with said claw for individually controlling the in and out movements of said claw relative to said gate when rotated about said common axis.
      (2) means coupled to said drive means for simultaneously rotating said in and out cams about said common axis and causing each of said in and out cams to produce a different frequency of in and out movement of said claw when said claw is operatively associated therewith, and
      (3) means for selectively connecting different ones of said in and out cams in operative relation with said film claw to vary the frequency at which said claw advances said film through said gate, and including;
         (a) a cam follower operatively interposed between said claw and said in and out cams and biased toward the latter, said follower being mounted for movement generally radially of said common axis into individual operative relationship with any selected one of said cams, and
         (b) means for moving said cam follower while maintaining its operative relationship with said claw.

2. A motion picture projector according to claim 1, including a hold-out cam rotatable about said common axis simultaneously with said plurality of in and out cams and concentrically arranged relative thereto for holding said claw out of engagement with said film while it reciprocates up and down, and means for adjusting said cam follower into engagement with said hold-out cam for projecting a given frame of the film as a still picture.

3. A motion picture projector according to claim 1, in which the edges of said in and out cams spaced radially from said common axis of rotation are tapered, and the surface of said cam follower is so formed that said follower can be shifted radially of the path of said cams while the same are rotating.

4. A motion picture projector according to claim 1, wherein said last mentioned means for selectively varying the rate of film advance is adjustable while said drive means is operating.

5. A motion picture projector according to claim 1, including means for reversing the direction in which the film claw moves the film through said gate to achieve reverse projection of the film without changing the direction of rotation of said drive means and without stopping the same.

6. A motion picture projector according to claim 1 in which said drive means comprises a drive shaft rotatable in one direction at a fixed speed; in which said up and down cam and said shutter are fixed to said shaft to be rotated at the same speed thereby; in which said plurality of in and out cams conjointly form a face cam rotatable on an axis substantially parallel to said drive shaft; in which said face cam is directly connected to said drive shaft through a reduction gearing to be rotated at a fraction of the speed of said drive shaft; and in which said means for selectively varying the frequency at which said claw advances said film through said gate includes a plurality of circular cam surfaces on one face of said face cam and arranged concentrically of the axis of said face cam for selective use for causing the in and out movement of said claw, one of said circular cam surfaces consisting of a succession of equally spaced arcuate cam surfaces controlling the inward movement of said claw equal in number to the gear reduction between said drive shaft and said face cam to produce a film advance at each stroke of the claw, and the other of said circular cam surfaces consisting of a succession of equally spaced arcuate cam surfaces controlling the inward movement of said claw differing in number from each other and being less than the number on said one circular cam; and means for selectively connecting said claw to different ones of said circular cam surfaces while said drive means is in operation.

7. A motion picture projector according to claim 6 in which said claw is normally moved out of engagement with the film, and in which said face cam includes a circular area lying in a single plane and in operative engagement with which circular area the claw can be connected so that it will be maintained out of engagement with the film for the purpose of projecting still pictures.

8. A motion picture projector according to claim 6, including means for selectively holding said claw out of engagement with the film while said drive means is operating to project a given frame of the film as a still picture.

9. A motion picture projector comprising in combination:
(A) a gate having a projection aperture and through which gate a motion picture film is adapted to be intermittently advanced past the aperture therein for the projection of successive image frames thereon,
(B) a film claw,
(C) means for mounting said claw for up and down and in and out movements relative to said gate during which movements it intermittently engages and advances the film through said gate,
(D) drive means,
(E) a shutter connected to said drive means to intermittently intersect the optical axis of said projection aperture and interrupt the passage of light therethrough at a given frequency,
(F) an up and down cam connected to said drive means to drive said claw up and down relative to said gate at said given frequency,
(G) means for imparting in and out movements to said claw in different time relations with said up and down movement thereof and including
(1) a face cam rotatably mounted on an axis substantially parallel to the optical axis of said apertured gate,
(2) a plurality of in and out cam surfaces on the face of said cam and arranged in groups of different numbers with the cam surfaces of each group circumferentially spaced from one another at the same radius from the axis of said cam so that said groups will move in concentric circular paths when said face cam is rotated,
(H) means for rotating said face cam in synchronism with said up and down cam and shutter,
(I) a cam follower extending between said face cam and said claw to cause said claw to move into and out of engagement with said film in response to rotation of said face cam, and
(J) means for selectively shifting said cam follower radially of said face cam and into the path of different ones of said groups of cam surfaces while said cam is rotating and while maintaining the connection between the follower and said claw to change the rate of film advance.

10. A motion picture projector comprising in combination:
(A) an apertured film gate through which a motion picture film is adapted to be intermittently advanced for the projection of successive image frames thereon,
(B) a film claw,
(C) means for mounting said claw for up and down and in and out movements relative to said gate during which movements it intermittently engages and advances the film through said gate,
(D) a rotatable up and down cam operatively connected to said claw for moving the claw through a complete up and down stroke on each revolution,
(E) a rotatable in and out cam operatively connected to said claw for producing in and out movements of the claw to effect engagement and disengagement of the claw with said film,
(F) drive means for rotating said up and down and in and out cams in timed relation to cause said claw to move said film downwardly through said gate,
(G) and means for connecting one of said cams to said drive means so that its phase relative to the other cam can be selectively shifted by 180° without stopping said drive means to reverse the direction of movement of the film through the gate.

11. A motion picture projector comprising in combination:
(A) an apertured film gate through which a motion picture film is adapted to be intermittently advanced for the projection of successive image frames thereon,
(B) a film claw,
(C) means for mounting said claw for up and down and in and out movements relative to said gate during which movements it intermittently engages and advances the film through said gate,
(D) a rotatable up and down cam operatively connected to said claw for moving the claw through a complete up and down stroke on each revolution,
(E) a rotatable in and out cam operatively connected to said claw for producing in and out movements of the claw to effect engagement and disengagement of the claw with said film,
(F) drive means for rotating said up and down and in and out cams in timed relation to cause said claw to move said film downwardly through said gate,
(G) means for selectively reversing the direction in which said claw moves said film through the gate without stopping said drive means including,
(1) means connecting said pulldown cam to said drive means so that its phase relation with respect to said in and out cam can be selectively shifted by 180° whereby said in and out cam will move said claw into engagement at the end of the down stroke of the claw and out of engagement with the film at the end of the up stroke of the claw.

12. A motion picture projector comprising in combination:
(A) an apertured film gate through which a motion picture film is adapted to be intermittently advanced for the projection of successive image frames thereon,
(B) a film claw,
(C) means for mounting said claw for up and down and in and out movements relative to said gate during which movements it intermittently engages and advances the film through said gate,
(D) a rotatable up and down cam operatively connected to said claw for moving the claw through a complete up and down stroke on each revolution,
(E) a rotatable in and out cam operatively connected to said claw for producing in and out movements of the claw to effect engagement and disengagement of the claw with said film,
(F) drive means for rotating said up and down and in and out cams in timed relation to cause said claw to move said film downwardly through said gate, including
  (1) a drive shaft
(G) means for selectively reversing the direction in which said claw moves said film through the gate without stopping said drive means including
  (1) means for rotatably mounting said up and down cam on said drive shaft and
  (2) means for selectively locking said up and down cam to said shaft in either one of two positions which are 180° apart.

13. A motion picture projector comprising in combination:
(A) an apertured film gate through which a motion picture film is adapted to be intermittently advanced for the projection of successive image frames thereon,
(B) a film claw,
(C) means for mounting said claw for up and down and in and out movements relative to said gate and during which movements it intermittently engages and advances the film through said gate,
(D) a rotatable up and down cam operatively connected to said claw for moving the claw through a complete up and down stroke on each revolution,
(E) a rotatable in and out cam operatively connected to said claw for producing in and out movements of the claw to effect engagement and disengagement of the claw with said film,
(F) drive means for rotating said up and down and in and out cams in timed relation to cause said claw to move said film downwardly through said gate, including
  (1) a drive shaft
(G) means for selectively reversing the direction in which said claw moves said film through the gate without stopping said drive means including
  (1) means for rotatably mounting said up and down cam on said shaft
  (2) a radial arm secured to said cam
  (3) a pair of drive pins diametrically disposed on opposite sides of said drive shaft and extending axially thereof,
  (4) means for connecting said drive pins to said drive shaft whereby they can be rotated around said shaft and at the same time be moved axially thereof,
  (5) and means for selectively moving alternate ones of said pins axially into the path of said radial arm to drivingly connect said cam to said drive shaft in one of two positions oriented 180° apart.

14. A motion picture projector comprising in combination:
(A) an apertured film gate through which a motion picture film is adapted to be intermittently advanced for the projection of successive image frames thereon,
(B) a film claw,
(C) means for mounting said claw for up and down and in and out movements relative to said gate and during which movements it intermittently engages and advances the film through said gate,
(D) a rotatable up and down cam operatively connected to said claw for moving the claw through a complete up and down stroke on each revolution,
(E) a rotatable in and out cam operatively connected to said claw for producing in and out movements of the claw to effect engagement and disengagement of the claw with said film,
(F) drive means for rotating said up and down and in and out cams in timed relation to cause said claw to move said film downwardly through said gate, including
  (1) a drive shaft
(G) means for selectively reversing the direction in which said claw moves said film through the gate without stopping said drive means including
  (1) means for rotatably mounting said up and down cam on said shaft
  (2) a radial arm secured to said cam
  (3) a disk fixed to said drive shaft to be rotated thereby and provided with a pair of holes diametrically disposed on opposite sides of said shaft
  (4) a bushing rotatably and slidably mounted on said drive shaft
  (5) a pair of drive pins fixed to said bushing and extending axially of said shaft into sliding engagement with opposite ones of said holes in said disk and
  (6) means for sliding said bushing along said drive shaft to move alternate ones of said pins into the path of said radial arm to drivingly connect said cam to said drive shaft in one of two positions oriented 180° apart.

15. A motion picture projector according to claim 14 in which said disk comprises a shutter to intermittently interrupt the passage of light through said gate.

16. A motion picture projector comprising in combination:
(A) an apertured film gate,
(B) a film claw,
(C) means for mounting said claw for up and down and in and out movement during which it intermittently engages and advances a motion picture film through said gate,
(D) a rotatable up and down cam coupled with said claw for effecting the up and down movements of said claw,
(E) a rotatable light shutter adapted to sweep across the aperture in said gate to interrupt the light during the advance of the film,
(F) drive means for rotating said up and down cam and said shutter at a given maximum frequency,
(G) means for imparting in and out movements to said claw in selectively different time relations with the up and down movements thereof to vary the rate of film advance and including
  (1) in and out cam means rotatable by said drive means for effecting the in and out movements of said claw in time relation with said up and down movements thereof, and
  (2) means for selectively varying the frequency of operation of said in and out movements of said claw between a maximum which is equal to said given maximum frequency of said up and down cam, wherein the film is advanced once for each up and down stroke of said claw, and at least one other frequency which is a fraction of said given maximum frequency of said up and down cam, wherein the film is advanced but once for a given number of up and down strokes of said claw, without stopping said drive means, and
(H) means for reversing the direction in which the film claw advances the film through said gate to achieve reverse projection at any selected frequency without changing the direction of rotation of said drive means and without stopping the same.

17. A motion picture projector according to claim 16, wherein said reversing means comprises means for connecting said up and down cam to said drive means so that its phase relative to said shutter and in and out cam means can be selectively shifted by 180° while said drive means is operating whereby during reverse projection said in and out cam means will move the claw into engagement with the film at the end of the down stroke and out of engagement with the film at the end of the up stroke of the claw while during forward projection it moves the claw into engagement with the film at the end of the up stroke and removes it from engagement with the film at the end of the down stroke.

18. A motion picture projector comprising in combination:
   (A) a gate having a projection aperture and through which gate a motion picture film is adapted to be intermittently advanced past the aperture therein for the projection of successive image frames thereon,
   (B) a film claw,
   (C) means for mounting said claw for up and down and in and out movement relative to said gate to intermittently advance the film through said gate,
   (D) drive means,
   (E) a shutter connected to said drive means to intermittently intersect the optical axis of said projection aperture and interrupt the passage of light therethrough at a given frequency,
   (F) an up and down cam connected to said drive means to drive said claw up and down relative to said gate at a frequency having a given relation to the light interruption frequency of said shutter,
   (G) means for imparting in and out movements to said claw in different time relations with said up and down movement thereof and including
      (1) a face cam,
      (2) means for rotating said face cam about an axis at right angles to the face thereof in synchronism with said up and down cam,
      (3) a plurality of cam surfaces provided on the face of said face cam and adapted to be individually operatively connected to said claw, said cam surfaces being arranged in circular groups concentric to and at different radial distances from the axis of rotation of said face cam, each group of cam surfaces constituting an in and out cam and including a different number of cam surfaces which, when connected to said claw, will, in dependence upon the speed of rotation of said face cam, determine the frequency of the in and out movement of said claw; one of said in and out cams having a number of cam surfaces which will cause said claw to move in and out at a maximum frequency which is equal to said given frequency at which said up and down stroke of the claw is operated, while each of the other of said in and out cams has a progressively lesser number of cam surfaces to move said claw in and out at lower frequencies which are fractions of said given frequency;
   (H) means for selectively connecting said claw to different ones of said in and out cams to vary the rate of film advance, and including
      (1) a cam follower operatively interposed between said claw and said face cam, and
      (2) means for selectively moving said cam follower substantially radially of said face cam and into engagement with different ones of said in and out cams.

19. A motion picture projector comprising in combination:
   (A) a gate having a projection aperture and through which gate a motion picture film is adapted to be intermittently advanced past the aperture therein for the projection of successive image frames thereon,
   (B) a film advancing claw including an arm extending transversely of the optical axis of said projection aperture and having a film engaging tooth extending at right angles to one end of said arm,
   (C) means for mounting said claw for up and down and in and out movement relative to said gate to intermittently advance the film through said gate.
   (D) a drive shaft located to one side of, and extending substantially parallel to, said optical axis;
   (E) a shutter connected to said drive shaft to intermittently intersect the optical axis of said projection aperture and interrupt the passage of the light therethrough at a given frequency;
   (F) an up and down cam connected to said drive shaft to drive said claw up and down relative to said gate at said given frequency;
   (G) means for imparting in and out movements to the film engaging tooth of said claw in different time relations with said up and down movement thereof to vary the rate of movement of the film through said gate, and including
      (1) a circular disk rotatably mounted on an axis located on the same side of the optical axis of said gate as said drive shaft and extending substantially parallel to and spaced laterally from said drive shaft,
      (2) means connecting said disk to said drive shaft to drive said disk at a given ratio relative to the speed of said shutter,
      (3) a plurality of cam surfaces provided on the face of said disk for controlling the inward movement of said claw and arranged in groups equally spaced concentrically to the axis of said disk, each group of cam surfaces in combination with the face of the disk therebetween constituting an in and out cam including a different number of cam surfaces which will, in dependence upon the speed of rotation of said disk, determine the frequency of the in and out movement of said claw, one of said in and out cams having a number of cam surfaces which will cause said claw to move in and out at a maximum frequency which is equal to said given frequency at which said up and down stroke of the claw is operated, while each of the other of said in and out cams has a progressively lesser number of cam surfaces to move said claw in and out at lower frequencies which are fractions of said given frequency,
   (H) means for selectively connecting said claw to different ones of said in and out cams to vary the rate of film advance, and including
      (1) a cam follower operatively interposed between said claw and said in and out cams and biased axially into engagement with the face of said disk provided with said cam surfaces, and
      (2) means for selectively moving said cam follower substantially radially of said circular disk and into engagement with different ones of said in and out cams while maintaining the engagement between it and said claw.

References Cited by the Examiner
UNITED STATES PATENTS

| 1,542,409 | 6/25 | Readeker | 352—194 |
| 2,097,220 | 10/37 | Blum | 226—66 |

FOREIGN PATENTS 812,020    4/59    Great Britain.

References Cited by the Applicant
FOREIGN PATENTS 1,329,373    4/63    France.

OTHER REFERENCES

German (application) 1,095,659, December 1960.

NORTON ANSHER, *Primary Examiner.*

WILLIAM MISIEK, *Examiner.*

Disclaimer 3,212,840.—*Robert J. Roman* and *Victor J. Witkowski*, Rochester, N.Y. FILM FEEDING MECHANISM. Patent dated Oct. 19, 1965. Disclaimer filed Aug. 14, 1975, by the assignee, *Eastman Kodak Company*.
Hereby enters this disclaimer to claim 16 of said patent.
[*Official Gazette October 21, 1975.*]